United States Patent
Weinman, Jr.

(10) Patent No.: US 6,940,857 B2
(45) Date of Patent: Sep. 6, 2005

(54) BROADCAST/MULTICAST SYSTEM AND PROTOCOL FOR CIRCUIT-SWITCHED NETWORKS

(75) Inventor: Joseph Bernard Weinman, Jr., Basking Ridge, NJ (US)

(73) Assignee: AT&T Corp., New York, NY (US)

(*) Notice: Subject to any disclaimer, the term of this patent is extended or adjusted under 35 U.S.C. 154(b) by 839 days.

(21) Appl. No.: 09/903,979

(22) Filed: Jul. 12, 2001

(65) Prior Publication Data

US 2003/0161337 A1 Aug. 28, 2003

(51) Int. Cl.[7] .............................................. H04L 12/18
(52) U.S. Cl. ..................................... 370/390; 370/357
(58) Field of Search ................................. 370/390, 432, 370/260, 355, 357, 360, 217, 218, 219, 220, 221, 344, 237, 238, 468, 352, 353, 354; 379/202.01, 205.01, 206.01

(56) References Cited

U.S. PATENT DOCUMENTS

| | | | | |
|---|---|---|---|---|
| 5,680,440 A | * | 10/1997 | Ghisler et al. | 455/432.1 |
| 5,953,673 A | * | 9/1999 | Neubauer et al. | 455/518 |
| 6,047,184 A | * | 4/2000 | Haces et al. | 455/445 |
| 6,222,829 B1 | * | 4/2001 | Karlsson et al. | 370/329 |
| 6,625,127 B1 | * | 9/2003 | Klas et al. | 370/310 |
| 6,671,883 B1 | * | 12/2003 | Rahman | 725/123 |

OTHER PUBLICATIONS

Infinity Broadcasting Corporation v. Wayne Kirkwood d/b/a Media Dial-Up, 965 F. Supp. 553 (S.D.N.Y. 1997), pp. 553–561.

* cited by examiner

Primary Examiner—Wellington Chin
Assistant Examiner—Son X. Nguyen
(74) Attorney, Agent, or Firm—Michael Haynes PLC

(57) ABSTRACT

A system and method directed to providing a broadcast/multicast in a circuit-switched network. An exemplary method includes receiving at a first switch a call directed to a called number; determining whether the first switch has an active connection to the called number; if the first switch has an active connection to the called number, merging the call with the active connection; and if the first switch does not have an active connection to the called number, routing the call to a next switch. The process is repeated as necessary until a next switch with an active connection is identified and/or the switch serving the called number is reached. The present invention conserves network resources and increases network efficiency, in part, by not carrying a call any further than is necessary for the caller to participate in a broadcast/multicast.

4 Claims, 8 Drawing Sheets

| Active/Inactive 205 | Radio Station 210 | Tele. No. 215 | Outbound Trunk/Line/TS 220 | Count 225 |
|---|---|---|---|---|
| Inactive | KADC | (415) 398-1234 | - | 0 |
| Active | KBCA | (215) 545-7000 | Phily/2468/7 | 5 |
| ... | ... | ... | ... | ... |

| Active/Inactive | Radio Station | Tele. No. | Outbound Trunk/Line/TS | Count |
|---|---|---|---|---|
| 305 | 310 | 315 | 320 | 325 |
| Active | KADC | (415) 398-1234 | San Fran/1234/3 | 2 |
| ... | ... | ... | ... | ... |

FIG. 3B
350

| KADC Caller Identifier | Inbound Trunk/Line/TS |
|---|---|
| 355 | 360 |
| (303) 892-5720 | Local Denver/8362 |
| MIN # | Local Denver/5621 |
| ... | ... |
| (212) 758-3259 | Kansas City/4139 |

BROADCAST/MULTICAST SYSTEM AND PROTOCOL FOR CIRCUIT-SWITCHED NETWORKS

FIELD OF THE INVENTION

This invention relates generally to telecommunications systems and, more particularly, to a method and system for efficiently broadcasting/multicasting content, such as music, video or any other broadcast/multicast data, using a circuit-switched connection.

BACKGROUND OF THE INVENTION

The current radio broadcast industry depends primarily upon broadcast towers to transmit signals to radio receivers. According to FCC regulations, the frequency and amplitude of these broadcasts are strictly regulated such that different radio stations broadcast in different geographic regions, and the number of stations per region is governed through FCC licenses. Although radio broadcasts can, at times, effectively transmit content to large audiences in a geographic region, and such a system may be accessed with ubiquitous devices and without incurring user subscription fees, such a system has various problems.

For example, the broadcasts are bound to moderately sized geographic regions, and the number of independent broadcasts is restricted by the licensed frequency spectrum. Thus, for AM and FM radio broadcasts, a traveler outside a given region cannot listen to broadcasts from that region (e.g., someone in New York City cannot listen in real time to a Los Angeles FM broadcast, except for syndicated programs).

In addition, the number of independent stations in a given region is restricted to a relatively small number as current RF technology and licensed spectrum do not permit thousands of AM/FM radio stations per region. Moreover, the cost of broadcast to a region large enough to attract substantial advertising revenue is high, so that small specialized radio stations are often not able to attract sufficient revenues to invest in larger area broadcasts, and the larger radio stations often have to broadcast programs that have wide appeal.

Radio stations recently have also used a packet-switched network such as the Internet to broadcast programs via a multicast or unicast. These programs may be archived and presented on-demand or may be real-time continuously present programs. At first, such programs were made available to users at a single server located at the source of the broadcast. However, this quickly led to server overload and, thus, a deterioration in the quality of the broadcast below acceptable levels and/or the inability of users to access the broadcast altogether. More recently, broadcasts have been made available to users at "the edge of the network" or, in other words, at servers local to the users. With the ever-increasing demands associated with handling larger volumes of data traffic, and the inherent difficulty in scaling multiple independent point-to-point streams, however, these servers have also been quick to reach overloaded conditions, with a resulting deterioration in service similar to that of source-based broadcasting/multicasting. Moreover, packet switching, with its inherently variable delays, is not optimally suited to a continuous stream that is of constant bandwidth.

It would be ideal if there were a way to leverage the benefits of circuit switches in conjunction with broadcasting/multicasting.

SUMMARY OF THE INVENTION

The above-identified problems are solved and a technical advance is achieved in the art by providing a system and method directed to providing a broadcast/multicast in a circuit-switched network. An exemplary method includes: receiving at a switch a call directed to a called number; determining whether the switch has an active connection to the called number; if the switch has an active connection to the called number, merging the call with the active connection; and if the switch does not have an active connection to the called number, routing the call to a next switch.

In accordance with an advantageous embodiment of the present invention, the called number is that of a radio station broadcast and the call is from a caller who wishes to receive the broadcast. Such a caller may be a fan who wants to listen to sports from his home town, a traveler who wants to listen to a radio station local to his destination for a local five-day weather forecast, or the like. As will be apparent from the detailed description, the present invention conserves network resources and increases efficiency, in part, by not carrying a call any further than is necessary for the caller to participate in a broadcast.

Other and further aspects of the present invention will become apparent during the course of the following description and by reference to the attached drawings.

BRIEF DESCRIPTION OF THE DRAWINGS

FIG. 2 illustrates an exemplary database utilized by switch 102 of FIG. 1.

FIGS. 3A and 3B illustrate exemplary databases utilized by switch 122 of FIG. 1.

DETAILED DESCRIPTION

Figure 1:
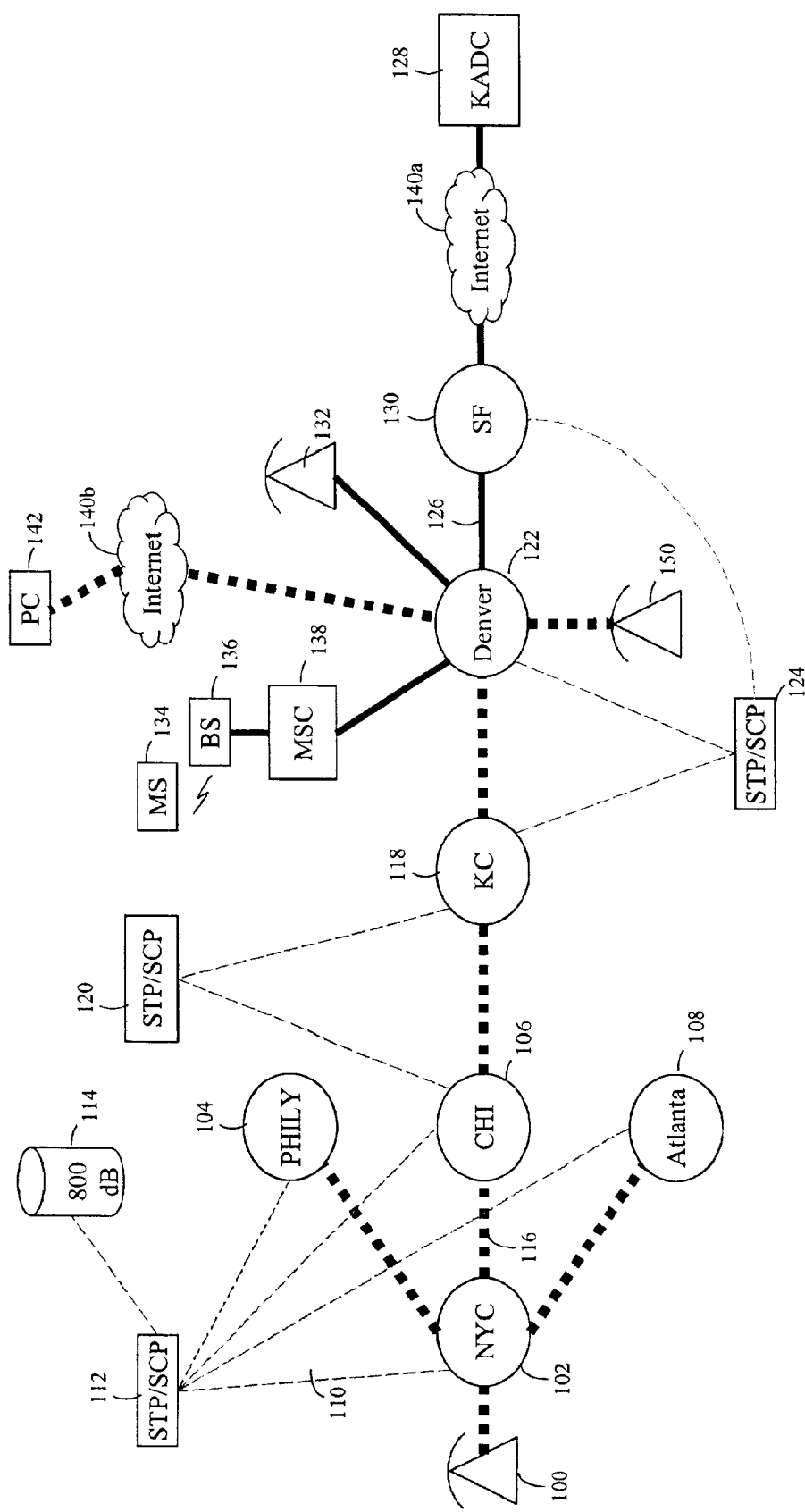
FIG. 1 is a block diagram illustrating an exemplary circuit-switched network for practicing the present invention.

Referring now to the drawings, FIG. 1 is a block diagram illustrating an exemplary circuit-switched network (e.g., the public switched telephone network or "PSTN") in which the present invention may be practiced. As will be described in detail hereinafter, the radio station KADC 128 shown in FIG. 1 is currently broadcasting/multicasting programs such as a news broadcast, a talk show or music via the circuit-switched network in accordance with the present invention. The signal of which the broadcast/multicast is comprised, which may be analog or digital, may be compressed to increase bandwidth using one or more compression techniques well-known in the art. KADC 128 may transmit the broadcast/multicast to the circuit-switched network in any number of ways including via a wireless transmitter, an Internet server, a telephony server or the like.

It is to be understood that one or more of the links of a broadcast/multicast could be carried on a non-circuit-switched network, such as the Internet, without departing from the present invention as long as one or more switches of a circuit-switched network is employed in distributing the broadcast/multicast. FIG. 1 illustrates an exemplary use of Internet 140a to carry one of the links of the KADC broadcast/multicast. This use of Internet 140a would include a circuit-switched voice grade channel from SF switch 130 to a Voice-Over-IP ("VoIP") gateway (not shown) to one or more IP routers (not shown) of Internet 140a, to another VoIP gateway (not shown) to KADC 128 as are well-known in the art. Thus, the switches used in a broadcast/multicast of the present invention may be heterogeneous. In other words, one switch in the connection may be a 5ESS switch available from Lucent Technologies, Inc., another switch in the connection may be a Definity PBX also available from Lucent and another switch could be an IP router available from Cisco Systems, Inc.

In FIG. 1, wired station 132 is currently receiving the broadcast/multicast from KADC 128 via Denver switch 122, San Francisco switch 130 and Internet 140a. Station 132's connection to Denver switch 122 may be via either an analog line or digital line depending upon station 132's subscription. Mobile station 134 is currently receiving the broadcast/multicast via those same switches and, in addition, via mobile switching center 138 and base station 136. These broadcast/multicast connections are shown in FIG. 1 by the dark solid lines 126 between these network and subscriber components. In accordance with one aspect of the present invention, the callers at station 132 and 134 have accessed KADC's broadcast/multicast program by dialing KADC's telephone number, which may be either a direct dial number or, more preferably, a toll-free (e.g., 800 or 888) number.

Wired station 150 served by Denver switch 122 is not currently receiving the broadcast/multicast, and thus the connection (here, the inactive but extant physical link) between station 150 and switch 122 is illustrated using a dark dashed line. Although also not shown as currently receiving the broadcast/multicast (as indicated by the dark dashed lines), personal computer (with speakers) 142 may receive the broadcast/multicast via the Denver and SF switches 122, 130 and Internet 140a and, in addition, via its own connection to Internet 140b, for example, using an Internet Access Provider (not shown) and VoIP technology.

As illustrated in FIG. 1, KADC's broadcast/multicast does not currently extend beyond Denver switch 122. Thus, the connections between the Denver switch 122, Kansas City switch 118, Philadelphia switch 104, Chicago switch 106, Atlanta switch 108 and New York switch 102 are also illustrated using dark dashed lines 116. The various switches in the network 102, 104, 106, 108, 118, 122 and 130 communicate amongst themselves and other network components such as toll-free database 114 to establish connections between calling and called party entities. These communications can occur using a data protocol such as signaling system seven (SS7) and data network components such as signal transfer points (STPs) and signal control points (SCPs) 112, 120, 124 as is well-known in the art. Moreover, the various STPs/SCPs also communicate with one another (not shown) as is also well-known in the art.

In accordance with one embodiment of the present invention, a caller at station 100 now wishes to join the KADC broadcast/multicast. To join the broadcast/multicast, the caller goes off-hook and dials KADC's access number, which, as mentioned above, may be either a direct dial number or a toll-free number. New York switch 102 receives the caller identifier (such as the calling party's automatic number identification ("ANI") or calling party number) and the called party number. For purposes of illustration, the caller's identifier is (212) 758-3259. If the called party number is a toll-free number, New York switch 102 will query toll-free database 114 for a translation of the toll-free number into KADC's POTS number. In accordance with the present invention, New York switch 102 will then use the POTS number to perform a look-up in an activity database to determine whether or not it has any active connections to KADC. FIG. 2 illustrates an exemplary activity database 200 utilized by switch 102 for this purpose.

As shown in FIG. 2, activity database 200 comprises one or more records, each of which corresponds to a particular content provider or, in an advantageous embodiment, a particular radio station. Each record has fields labeled active/inactive 205, radio station 210, telephone number 215, outbound trunk/line/time slot 220 and count 225. The active/inactive field 205 indicates whether the switch associated with database 200, in this case switch 102, has an active connection to the radio station whose name appears in field 210 and telephone number appears in field 215. Field 220 provides an indication of the outbound trunk on which an active connection to the radio station exists, and further includes an indication of the line interface unit and time slot assigned to the active connection, as will be discussed in detail in connection with FIG. 4. Lastly, field 225 indicates the number of incoming calls currently merged onto an active connection at switch 102. As illustrated in FIG. 2, an active connection exists at New York switch 102 for KBCA, but not for KADC, which, for purposes of illustration, is the broadcast/multicast that the caller at station 102 wishes to receive.

Returning to FIG. 1, switch 102 will compare the received telephone number against the telephone number entries in field 215 of the records stored in activity database 200 to determine whether the call is to a content provider for which broadcast/multicast service is provided. In the instant example, the call is to KADC which happens to be a content provider for which such service is provided. Thus a record for KADC is located and the entries in fields 205 and 225 are reviewed to determine both whether switch 102 currently has an active connection to KADC and, if so, the number of incoming calls that are merged onto that connection at switch 102. If a connection exists, the new call can be merged onto the connection. If an active connection does not exist at switch 102, as is the case with the KADC record depicted in FIG. 2, switch 102 (together with other switches in the network) will take steps either to route the call to a switch where the call can be merged onto an active connection or complete the call to KADC (in the event that an active connection does not exist), as will be discussed in detail hereinafter in connection with FIG. 5.

FIGS. 3A and 3B illustrate exemplary databases utilized by Denver switch 122 of FIG. 1. Database 300 illustrated in FIG. 3A is essentially identical in structure and content to database 200 of New York switch 102 illustrated in FIG. 2. Thus, each record has fields labeled active/inactive 305, radio station 310, telephone number 315, outbound trunk/line/time slot 320 and count 325. The record shown is for KADC. As illustrated by field 305 of the KADC record in FIG. 3A, Denver switch 122 includes an active connection to KADC. The active connection is via time slot 3 of a TDM back plane, line interface unit 1234 connected to an outbound San Francisco trunk. This connection currently involves two participants, as indicated in the count field 325 of the KADC record.

In addition to the activity database 300 of FIG. 3A, FIG. 3B illustrates an exemplary count database 350 at switch 122 for tracking the participants to an active connection. The count database includes fields for the caller identifier 355 and the inbound trunk and line 360 associated with the participants. As shown in FIG. 3B, the two participants on the active connection to KADC are a conventional POTS telephone and a cellular telephone, which are identified in field 330 by a station telephone number and a mobile identification number, respectively. The POTS telephone is participating in the active connection on inbound local Denver trunk and line interface unit 8362. Similarly, the cellular telephone is participating in the connection on inbound local Denver trunk and line interface unit 5621. It is to be understood that although the participants may be on different trunks and lines, they are merged onto the same timeslot of the TDM back plane since all are participating in the same broadcast/multicast.

FIG. 3B also includes a yet to be created record corresponding to a yet to be established merger of the call from station 100 onto the active connection at switch 122 in accordance with the exemplary method described below in connection with FIG. 5. Once merged onto the active connection at Denver switch 122, however, the record will be created in switch 122's database and include station 100's caller identifier—namely, (212) 758-3259—as well as an indication of the inbound trunk and line interface unit associated with station 100's call. As mentioned above, the call from station 100 is merged into the same time slot as the calls from the other participants to KADC's broadcast/multicast.

Figure 4:
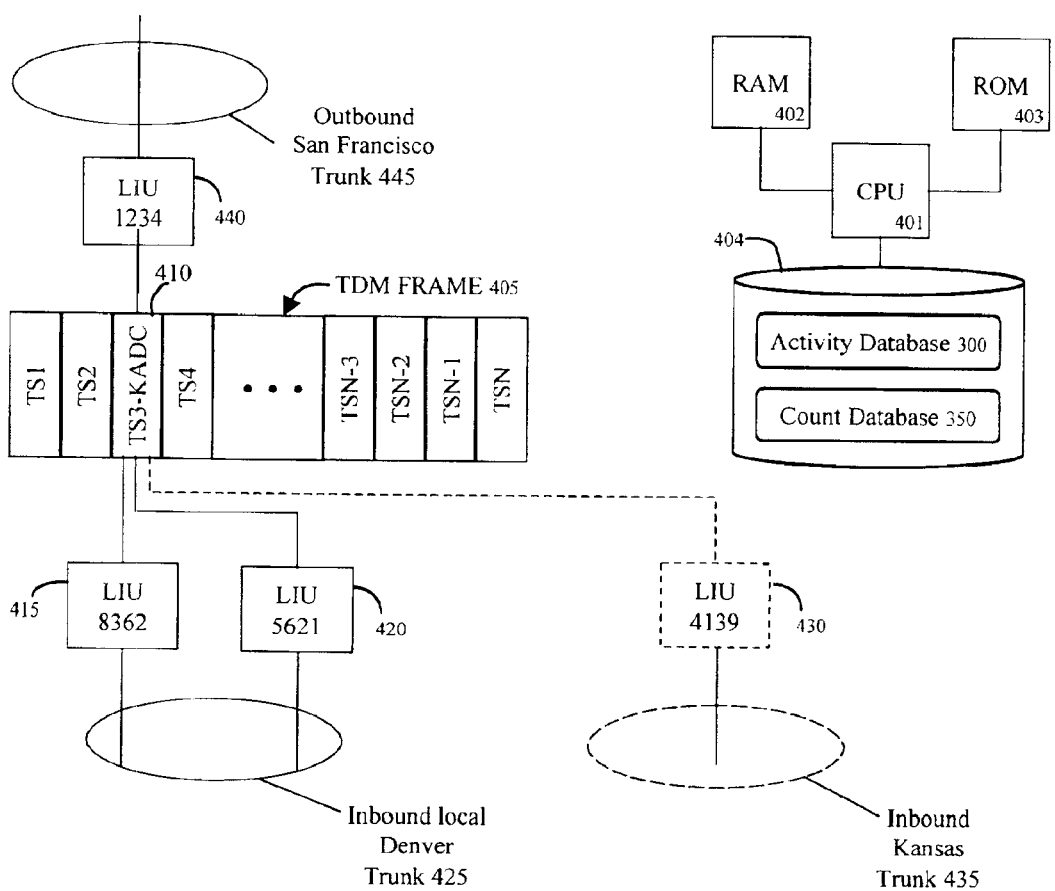
FIG. 4 depicts a block diagram of switch 122 of FIG. 1.

FIG. 4 depicts a block diagram of the relevant portions 400 of Denver switch 122 of FIG. 1. As shown therein, switch 122 includes a CPU 401 together with associated memory 402, 403 for adding and dropping a caller to or from an active connection, as will be discussed in detail hereinafter in connection with FIGS. 5 and 6. CPU 401 is also coupled to a data storage device 404, which includes the participant and count databases (300, 350) discussed above in connection with FIGS. 3A and 3B. Rather than being incorporated into the switch, the data storage device, and thus databases 300, 350, could reside remotely from the switch, such as in a service adjunct external to the switch. In addition, switch 122 includes a TDM back plane (not shown) as is well-known in the art. Although a digital TDM switch is discussed in connection with the exemplary embodiment, any switch with the capability to connect one incoming line to a plurality of outgoing lines could be used. Thus, an analog switch, such as a cross-bar switch, could be used instead of the aforesaid digital TDM switch. In any event, as shown in FIG. 4, TDM frame 405 of the TDM back plane includes a predetermined number of time slots 1 through N. The KADC broadcast/multicast, as discussed above, is assigned to time slot 3. Thus, as also discussed above, KADC is broadcasting/multicasting in time slot 3 via line interface unit 1234 (element 440) and outbound San Francisco trunk 445. The POTS station 132 and cellular station 134 discussed above are participating in the KADC broadcast/multicast via line interface units 8362 and 5621 (elements 415 and 420), respectively, and local Denver trunk 425. FIG. 4 also shows the yet to be established merger of station 100 onto the active KADC connection in time slot 410 of the TDM frame via inbound Kansas City trunk 435 and line interface unit 4139 (element 430). Moreover, switch 122 may include a module for decompressing the broadcast/multicast content, if necessary, for distribution to a caller. Alternatively, the decompression module may be incorporated into the caller's station.

It is to be understood that each of the switches that implement the broadcast/multicast protocol of the present invention would include essentially the same hardware and functionality as described above with respect to Denver switch 122 for adding and dropping a caller to or from an active connection.

Figure 5A:
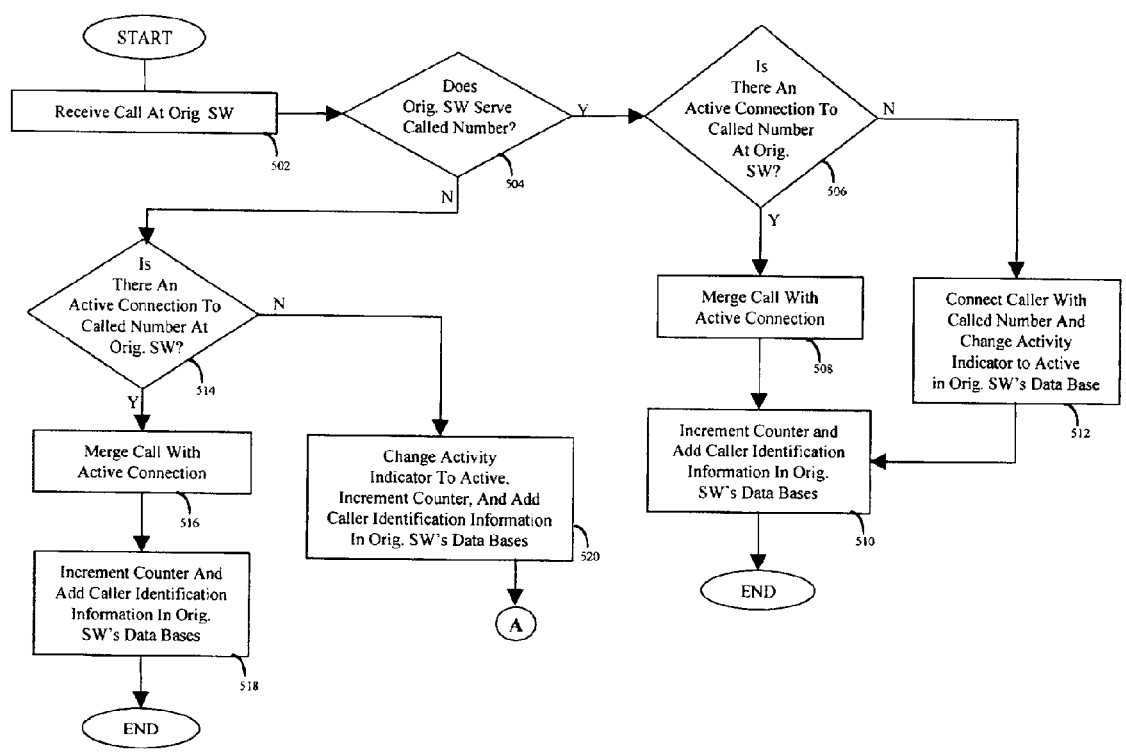
FIGS. 5A–5C are flow charts illustrating exemplary processes by which a caller is added to a broadcast/multicast in accordance with the present invention.
Figure 5B:
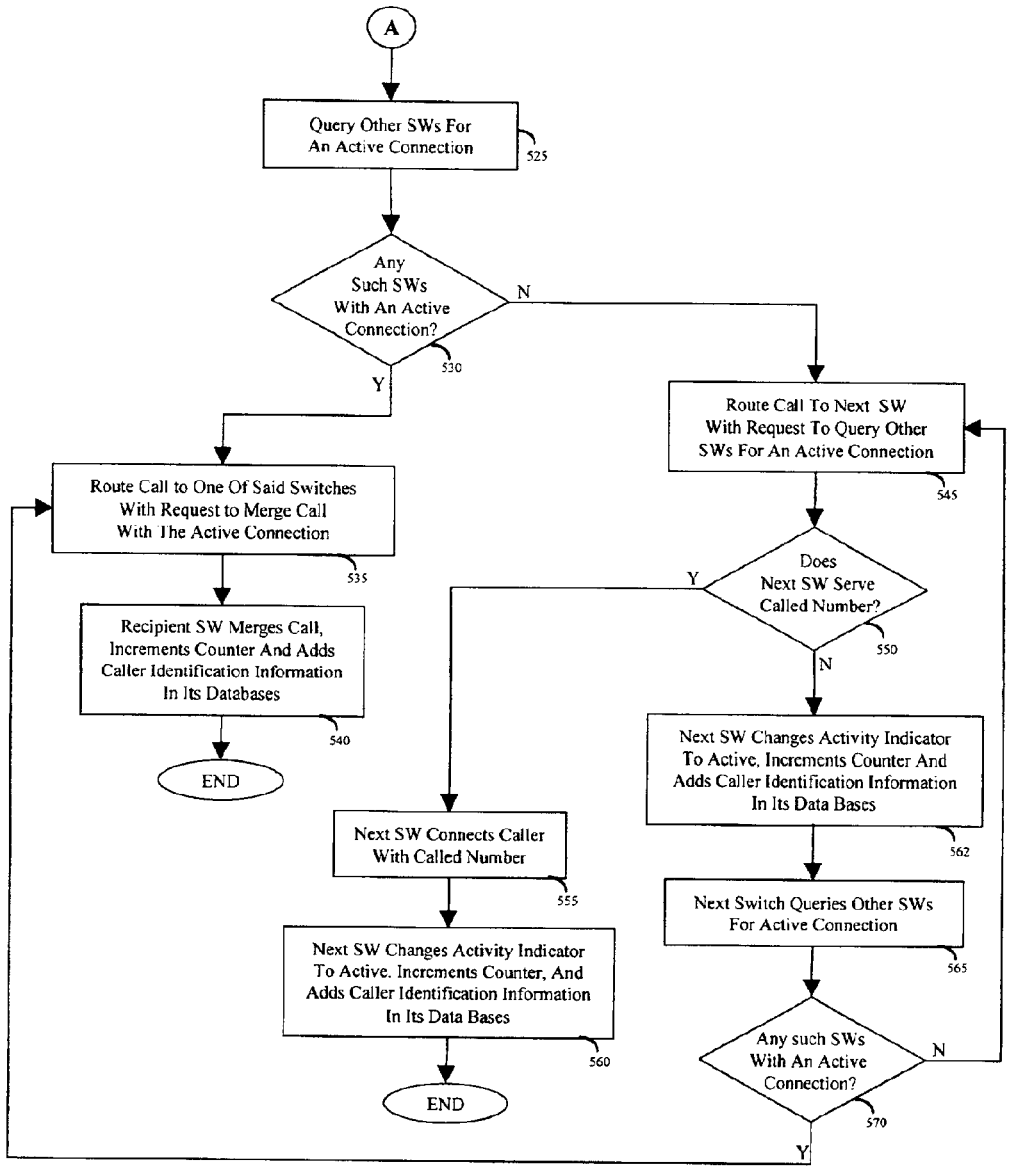
Figure 5C:
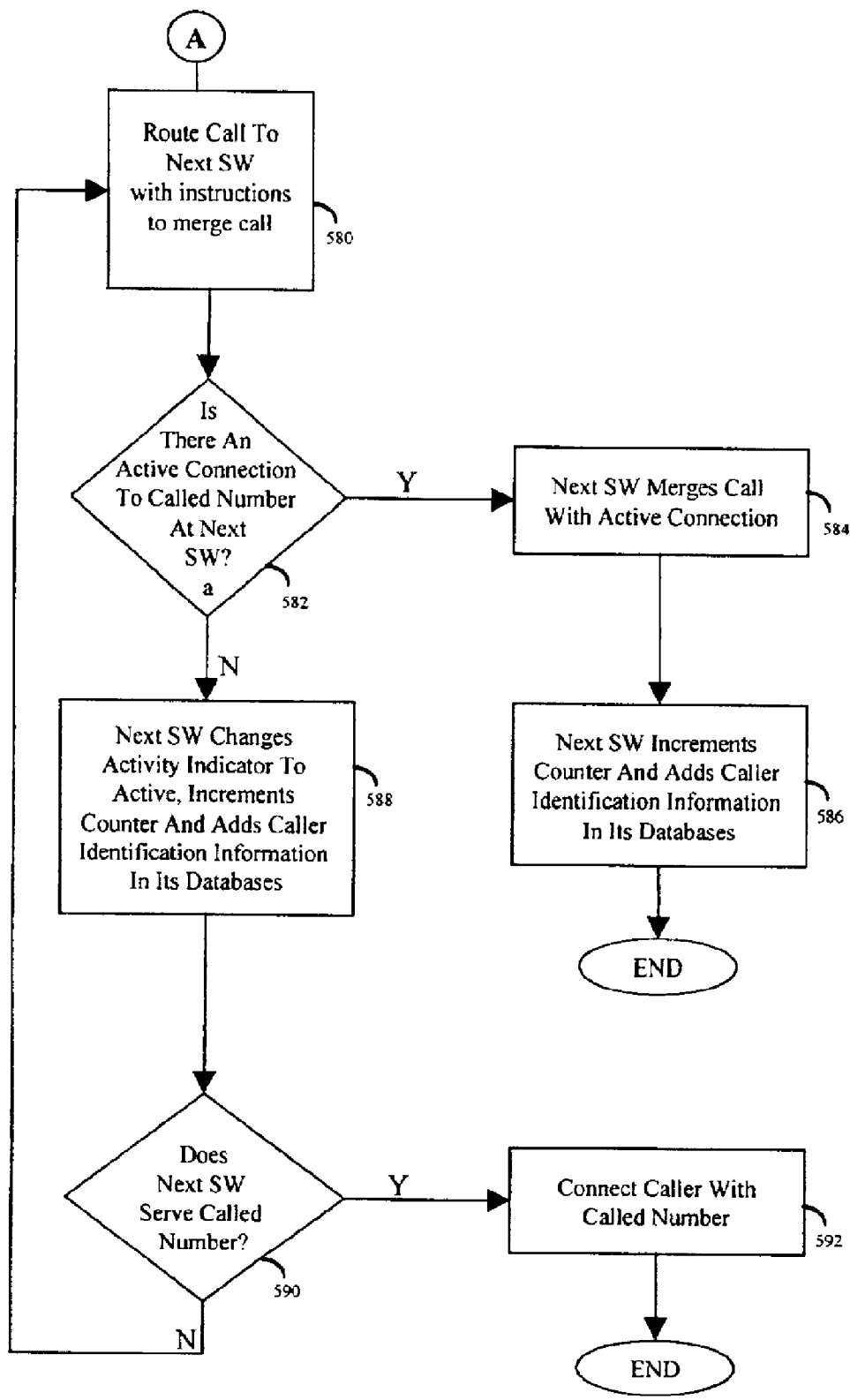

FIGS. 5A–C are flow charts illustrating exemplary processes by which a caller, such as the one at station 100 in FIG. 1, is added to a broadcast/multicast in accordance with an advantageous embodiment of the present invention. In step 502, an originating switch, such as switch 102 of FIG. 1, receives a call directed to a content provider such as KADC. The call includes a caller identifier and the called party number. If the called party number is a toll-free number, the originating switch will query a toll-free database, such as 800 database 114, for a translation of that number into the corresponding POTS number in a manner well known in the art.

It is to be understood that, rather than receiving the call directly from the caller, the originating switch may receive the call from an intermediary, such as a broadcast/multicast service server. For example, in such an embodiment, the caller would dial a telephone number corresponding to the service server and select KADC from an interactive menu of available radio stations. The server would then place the outgoing call to KADC and, when a connection is established in accordance with the present invention, bridge the incoming call with the outgoing call.

In step 504, the originating switch determines whether the called number is local to it (i.e., whether the originating switch serves both the calling and called numbers). If the called number is local to the originating switch, in step 506, the originating switch determines whether it has an active connection to the called number. The switch accomplishes this by accessing the activity record for the called number from its activity database and comparing the received called number with the entry in field 205 of the record. If an active connection exists, in step 508, the originating switch merges the incoming call with the active connection and, in step 510, increments the counter in field 225 of the activity record by "1". In addition, the originating switch would add the caller identification information, such as the calling number (212-758-3259) and the incoming trunk and line data (local New York/3456) to the content provider's record in the count database.

If in step 506 it is determined that an active connection does not exist at the originating switch, in step 512 the originating switch connects the calling station with the called station and changes the activity indicator in field 205 of the switch's activity database to active. In step 510, the originating switch increments the counter in field 225 of the activity record by "1" and adds the caller identification information to the count database.

If in step 504 the originating switch determines that it does not serve the called number, then in step 514 the originating switch determines whether it has an active connection to the called number. If an active connection exists, in step 516 the originating switch merges the incoming call with the active connection. In step 518, the originating switch increments the counter in field 225 of the activity record in its activity database and adds the caller identification information to the count database. If in step 514 it is determined that an active connection does not exist, in step 520 the originating switch changes the activity indicator in field 205 of its activity database to "active", increments the counter in field 225 of the activity record by "1" and adds the caller identification information to the count database. The originating switch then proceeds to step 525 of FIG. 5B.

Turning to FIG. 5B, in step 525 the originating switch queries other switches to determine which, if any, of the other switches have an active connection to the content provider. Selection of the other switches to query can be either "static" or "dynamic". For example, in the case of a static selection, the originating switch would simply query the same predetermined number of switches for an active connection each time that a call to a broadcast/multicast provider is received. Alternatively, the selection can be based upon dynamic factors such as least-cost routing, load sharing and the like, as are well known in the art.

Based on the responses from the queried switches, in step 530 the originating switch determines whether any of the queried switches has an active connection to the content provider. If one of the queried switches has an active connection, the originating switch, in step 535, routes the call to the switch with the active connection together with instructions to merge the call with the connection. In the event that a plurality of switches respond with an active connection, the originating switch can further request count information from those switches and route the call accordingly. (Alternatively, count information could instead be part of the acknowledgement message.) For example, the call could be routed to the switch with the lowest count, the greatest count or one with a count somewhere in between either statically or taking into account dynamic factors as discussed above in connection with step 525.

In step 540, the recipient switch merges the call with the active connection, increments the counter in the appropriate record of the activity database and adds the caller identification information to the appropriate record of the count database. The caller identification information includes the incoming trunk and line assigned to the call. As discussed above, the assigned time slot would be the same as the time slot assigned to the active connection.

If the originating switch determines in step 530 that none of the switches it queried has an active connection to the content provider, in step 545 the originating switch will route the call to a "next" switch (preferably one of those queried by the originating switch in step 525). For example, in FIG. 1, originating switch 102 may route the call to Chicago switch 106. The originating switch also will instruct the next switch to query other switches to determine which, if any, has an active connection to the content provider. In step 550, the next switch will first determine whether it serves the called number. If the next switch serves the called number, in step 555 it will connect the calling station with the called station and, in step 560, will change the activity indicator, increment the counter and add the caller identification information in its databases.

If it is determined in step 550 that the next switch does not serve the called number, the next switch, in step 562, will change the activity indicator to active, increment its counter and add caller identification information to its databases. In step 565, the next switch queries other switches to determine whether any of them have an active connection to the content provider. As discussed above in connection with step 530, the selection of the other switches to query can be performed either statically or dynamically. In step 570, if one or more of the switches queried has an active connection, the next switch will route the call in step 535, to one of those switches as previously discussed, with instructions to merge the call with the active connection. In step 540, the recipient switch will merge the call with the active connection, increment its counter and add caller identification information in its databases.

In step 570, if none of the switches queried by the next switch has an active connection to the content provider, steps 545 through 570 are repeated, as necessary, until a next switch with an active connection is identified into which the call can be merged and/or the switch serving the called number is reached. Thus, rather than requiring an untold number of point-to-point connections between callers and a content provider, the present invention makes use of a spanning tree architecture to efficiently broadcast/multicast content.

FIG. 5C illustrates one alternative to the process set forth in FIG. 5B. In particular, in the method of FIG. 5B, the network switches, rather than querying other switches to identify one with an active connection, will simply pass the call to a next switch with instructions to merge the call with an active connection should one exist at the next switch. Thus, turning to FIG. 5C, in step 580, the originating switch passes the call to a next switch. The selection of a next switch to which to pass the call could either be performed statically (e.g., the next switch in a ring) or dynamically (e.g., taking into account least-cost routing, optionally based on real-time link pricing).

In step 582, the next switch determines whether there is an active connection to the called number at the next switch. If there is an active connection, in step 584, the next switch merges the call with the active connection. In step 586, the next switch increments the counter and adds caller identification information to its databases. If the next switch determined in step 582 that it did not have an active connection to the called number, in step 588 the next switch changes the activity indicator to active, increments the counter and adds the caller identification information in its databases. In step 590, the next switch determines whether it serves the called party number. If the next switch serves the called number, in step 592 it connects the caller with the called number. If it does not serve the called number, steps 580 through 592 are repeated as necessary until a next switch with an active connection is identified and/or the switch serving the called number is reached.

From the foregoing discussion, it will be readily apparent that the present invention greatly conserves network resources and increases efficiency by ensuring that a call is not carried any further than is necessary for a caller to participate in a content provider's broadcast/multicast.

Figure 6:
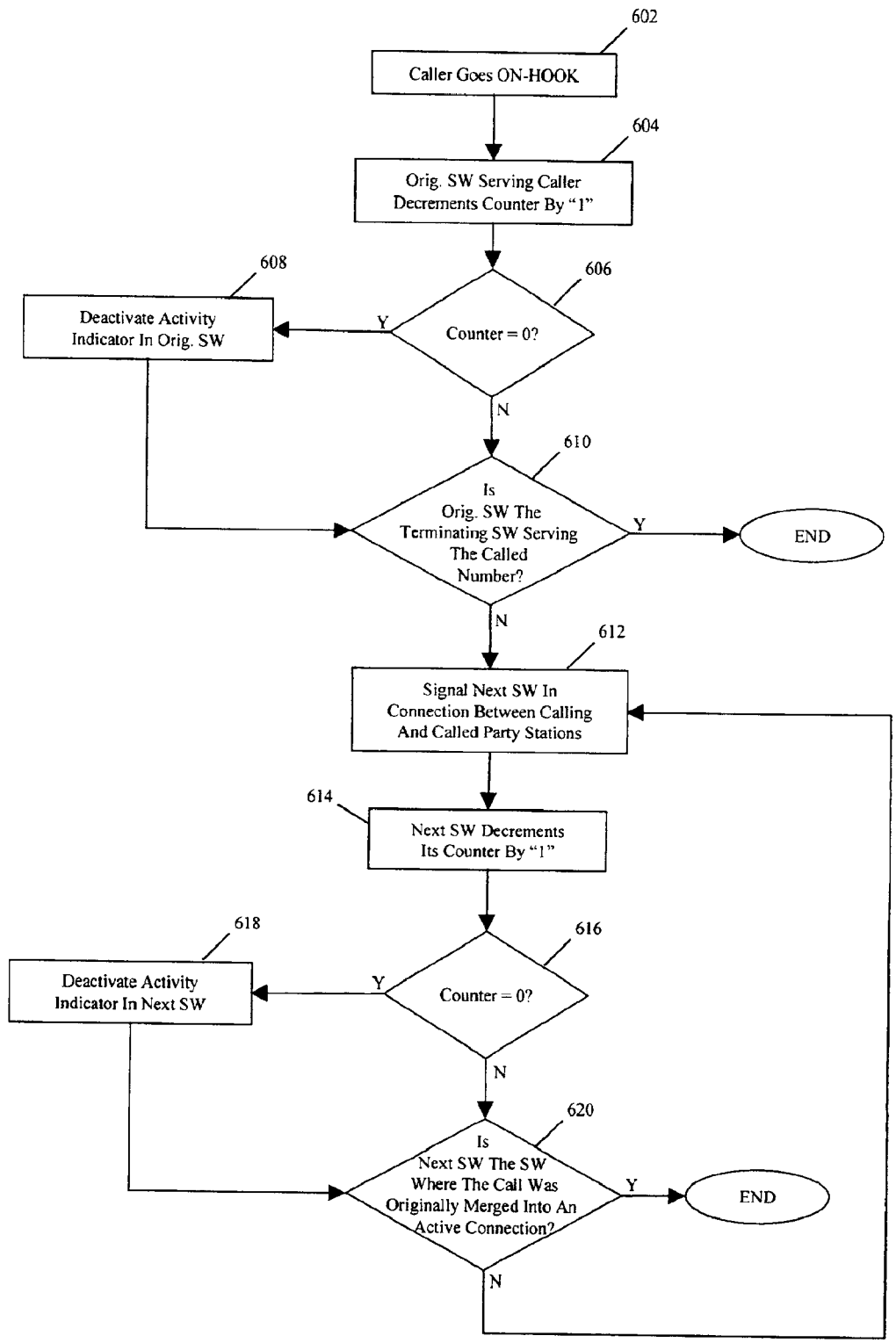
FIG. 6 is a flow chart illustrating an exemplary process by which a caller is dropped from a broadcast/multicast in accordance with the present invention.

FIG. 6 is a flow chart illustrating an exemplary process by which a caller is dropped from a broadcast/multicast in accordance with the present invention. In step 602, a caller at a calling station goes on-hook, and thus ceases to participate in the content provider's broadcast/multicast. In step 604, the originating switch serving the caller decrements the appropriate counter in its activity database. In step 606, if the counter equals zero, then in step 608 the originating switch deactivates the appropriate activity indicator in its activity database. After step 608 or, if the counter did not equal zero in step 606, then in step 610, the originating switch determines whether it also serves the called number (i.e., whether the originating switch is also the terminating switch). If the originating switch serves the called number, the process of dropping the caller ends.

If the originating switch does not serve the called number, then in step 612 the originating switch signals the next switch in the connection between the calling and called party stations to take appropriate action to drop the caller from its record of participants on an active connection to the content provider. In particular, in step 614, the next switch will decrement the appropriate counter in its activity database and remove the corresponding caller identification information from the count database. In step 616, if the counter equals zero, then in step 618, the next switch will deactivate the appropriate activity indicator in its activity database. After step 618 or, if the counter did not equal zero in step 616, in step 620, the next switch determines whether it is the switch where the call was originally merged into an active connection. (This could be tracked for each call, for example, by a "1" (yes) or "0" (no) in an "original merger" field (not shown) of count database 350.) If it is, the process of dropping the caller ends. However, if the next switch is not the switch where the call was originally merged into an active connection, then steps 612 through 620 are repeated, as necessary, until that switch (which may or may not be the terminating switch serving the called number) is reached.

In an alternate embodiment, an active connection may be maintained at least part of the way regardless of the number of active users. For example, a particular switch may always be tuned to a particular radio station, for example KADC, even if the number of active users drops to zero. In that instance, the switch will not deactivate the activity indicator in its activity database even if the counter drops to zero.

The many features and advantages of the present invention are apparent from the detailed specification, and thus it is intended by the appended claims to cover all such features and advantages of the invention which fall within the true spirit and scope of the invention.

Furthermore, since numerous modifications and variations will readily occur to those skilled in the art, it is not desired that the present invention be limited to the exact construction and operation illustrated and described herein and, accordingly, all suitable modifications and equivalents which may be resorted to are intended to fall within the scope of the claims. For example, although the receivers of the broadcast/multicast in the instant disclosure are depicted as traditional POTS and wireless telephones, other devices could be used to receive a broadcast/multicast in accordance with the present invention. These include but are not limited to: a computer with the hardware (e.g., speakers) and functionality necessary to place and receive telephone calls; a "smart" home stereo receiver coupled to a telephone jack for a landline reception (or, alternatively, coupled to, or with, a wireless capability for a wireless reception via, e.g., a cellular network); or a "smart" car radio coupled to, or with, a wireless capability for a wireless reception.

I claim:

1. A method of dropping a caller's station from a broadcast/multicast in a circuit-switched network, comprising:

signaling from a first switch to a second switch to indicate that the caller's station is to be dropped from the broadcast/multicast, and if the second switch is not a switch where a call from the caller's station was originally merged into an active connection, then the second switch signaling a third switch to indicate that the caller's station is to be dropped from the broadcast/multicast.

2. The method of claim 1 further comprising:

if the second switch is not a switch where a call from the caller's station was originally merged into an active connection, the second switch decrementing a counter.

3. The method of claim 2 further comprising:

if the counter equals zero, the second switch deactivating an activity indicator.

4. The method of claim 2 further comprising:

if the counter equals zero, the second switch maintaining an activity indicator in an active state.

* * * * *